No. 817,739. PATENTED APR. 10, 1906.
J. LOEPP.
VEHICLE.
APPLICATION FILED MAY 27, 1904.
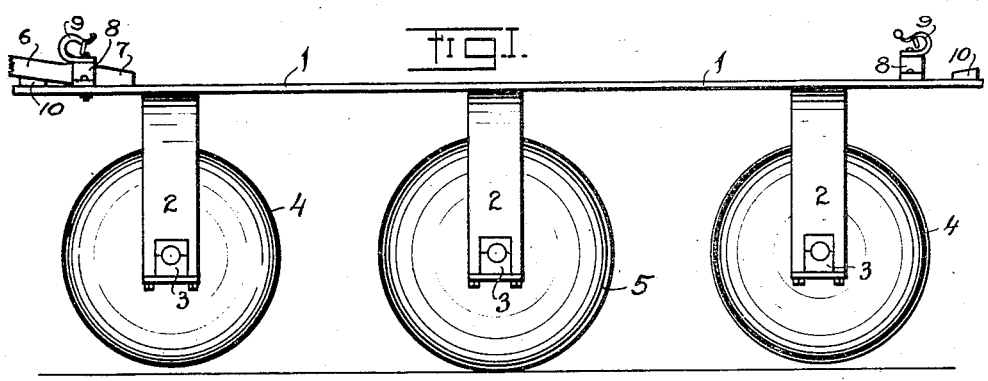
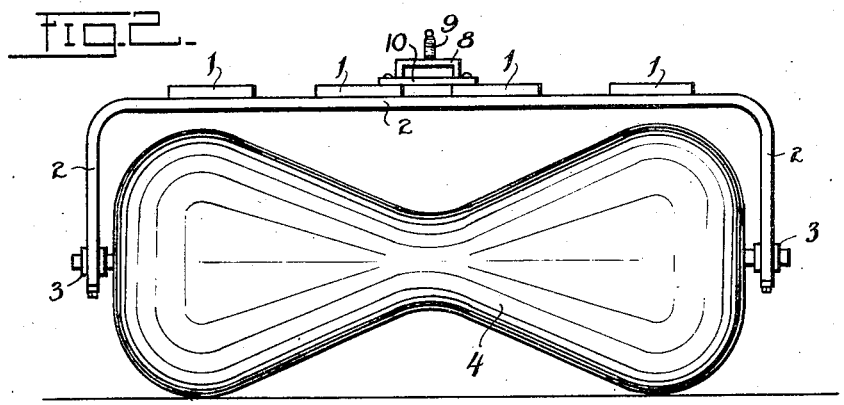
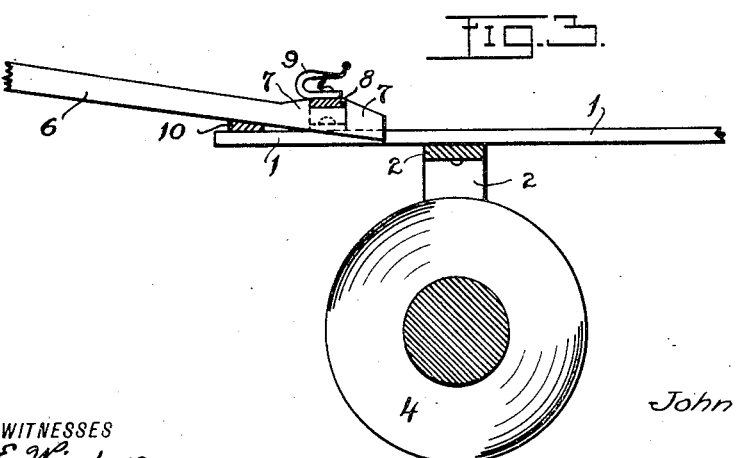
WITNESSES
W. E. Windsor
James M Palmer
John Loepp
INVENTOR
BY HIS ATTORNEY
R. J. Elliott

UNITED STATES PATENT OFFICE.

JOHN LOEPP, OF NEAR TACOMA, WASHINGTON.

VEHICLE.

No. 817,739.　　　　Specification of Letters Patent.　　　Patented April 10, 1906.

Application filed May 27, 1904. Serial No. 210,090.

*To all whom it may concern:*

Be it known that I, JOHN LOEPP, a citizen of the United States of America, residing near Tacoma, in the county of Pierce and State of Washington, have invented certain new and useful Improvements in Vehicles, of which the following is a specification, reference being had therein to the accompanying drawings.

This invention relates to vehicles, especially to that class adapted for use on farms and parts of the country where the soil is soft, miry, or boggy, and has for its objects, first, to provide a vehicle which shall be able to bear heavy loads without cutting the soils excessively; second, which will not sink so deep in the mire as to make it impossible for a horse to extract it; third, in which the roller will climb over obstructions of moderate size, and, fourth, which is reversible. I attain these objects by the devices illustrated in the accompanying drawings, in which—

Figure 1 is a side view of my vehicle. Fig. 2 is an end view thereof, and Fig. 3 is a section of one end thereof.

Similar numerals of reference refer to similar parts throughout the several views.

I have illustrated my vehicle as consisting of four planks 1, running longitudinally and each secured to three cross-frames 2, constructed, preferably, of metal and being bent down at each end to receive the bearing-boxes 3 of the three wheels or rollers. These boxes 3 can be secured into the frames 2 in any suitable manner, and in some instances it may be advisable to have a spring connection therebetween.

I prefer to mount my vehicle on three wheels or rollers, the end wheels 4 being of slightly less diameter than the center wheel 5; but all of them are of the shape shown in Fig. 2. They extend across the vehicle between the turned-down ends of the frames 2 and have their greatest diameter at about the same gage as is usual with vehicles at the present time, tapering toward the center, where the smallest diameter is, and also rounded off toward the ends. Thus with a light load and hard soil my wheels will roll on a very small surface, which will increase with the load and with the softness of the soil. The end wheels 4 being of smaller diameter, serve to facilitate turning the vehicle and to place the greater portion of the load on the middle wheel 5.

The pole 6 is provided with an enlarged end 7, having a notch therein adapted to fit around the strap 8, to which the hook 9 for receiving the ring of the whiffletree is attached. The cross-strap 10 is lower than the strap 8. The straps 8 and 10 and the hook 9 are duplicated at the other end, so that the pole 6 may be placed at either end of the vehicle. The pole 6 is placed in position by lifting its outer end up and inserting the end 7 between the straps 8 and 10 and then lowering the outer end, so that the slot or notch in the end 7 will engage the strap 8.

The rounded ends of the wheels 4 and 5 are also valuable as enabling the wheel to climb over obstacles without forcing the wheel to one side.

I have illustrated my vehicle as having three wheels and as being adapted for farms; but I do not confine myself to the number of wheels used nor to the form of the vehicle-body, as I find that it is also well adapted for hand-trucks, especially where tracks or similar obstructions have to be crossed.

What I claim, and desire to secure by Letters Patent, is—

A double vehicle-wheel extending in one body across the vehicle and formed with a continuous bearing-surface of constantly-varying diameter to present a double conical shape with rounded ends without angles or edges or corners.

In testimony whereof I affix my signature in presence of two witnesses.

JOHN LOEPP.

Witnesses:
　F. P. HASKELL, Jr.,
　GEO. E. DIXON.